United States Patent
Berger et al.

(10) Patent No.: US 7,411,962 B2
(45) Date of Patent: Aug. 12, 2008

(54) METHOD AND APPARATUS FOR DYNAMIC BANDWIDTH ALLOCATION FOR VOICE AND DATA MULTIPLEXING OVER AAL-2 CONNECTIONS

(75) Inventors: Ricardo Berger, Kadima (IL); Eran Kirzner, Rishon Lezion (IL); Ronen Weiss, Herzelia (IL); Yoram Yeivin, Hod Hasharon (IL)

(73) Assignee: Wintegra Ltd., Ra'anana (IL)

( * ) Notice: Subject to any disclaimer, the term of this patent is extended or adjusted under 35 U.S.C. 154(b) by 1184 days.

(21) Appl. No.: 10/450,821

(22) PCT Filed: Dec. 11, 2001

(86) PCT No.: PCT/IL01/01147

§ 371 (c)(1),
(2), (4) Date: Jun. 18, 2003

(87) PCT Pub. No.: WO02/51166

PCT Pub. Date: Jun. 27, 2002

(65) Prior Publication Data

US 2004/0057438 A1    Mar. 25, 2004

(51) Int. Cl.
*H04L 12/28*    (2006.01)
(52) U.S. Cl. .................. 370/395.64; 370/395.21; 370/395.41; 370/395.61; 370/395.63
(58) Field of Classification Search .......... 370/395.21, 370/395.41, 395.61, 395.63, 395.64
See application file for complete search history.

(56) References Cited

U.S. PATENT DOCUMENTS

| 5,537,446 | A | * | 7/1996 | Lakshman et al. | 375/371 |
|---|---|---|---|---|---|
| 5,583,857 | A | * | 12/1996 | Soumiya et al. | 370/233 |
| 5,930,265 | A | | 7/1999 | Duault et al. | |
| 6,075,798 | A | | 6/2000 | Lyons et al. | |
| 6,169,738 | B1 | * | 1/2001 | Sriram et al. | 370/395.21 |
| 6,219,339 | B1 | | 4/2001 | Doshi et al. | |
| 6,266,343 | B1 | | 7/2001 | Caves | |
| 6,449,276 | B1 | * | 9/2002 | Subbiah et al. | 370/395.6 |
| 6,603,766 | B1 | * | 8/2003 | Zifroni et al. | 370/395.6 |
| 6,621,821 | B1 | * | 9/2003 | Song | 370/395.6 |
| 2003/0026262 | A1 | * | 2/2003 | Jarl | 370/394 |

FOREIGN PATENT DOCUMENTS

WO    WO 00/30304    5/2000

OTHER PUBLICATIONS

International Search Report of Application No. PCT/IL01/01147 Issued on Jun. 26, 2002.

* cited by examiner

*Primary Examiner*—Fan Tsang
*Assistant Examiner*—Hemant S Patel
(74) *Attorney, Agent, or Firm*—PEarl Cohen Zedek Latzer, LLP

(57) ABSTRACT

In some embodiments of the present invention, applications presenting user information streams at a service access point (SAP) to AAL-2 above the Common Part Sublayer (CPS) may provide values for predefined parameters that may determine how frames of information in the user information streams are segmented in run-time into CPS packets and packed into CPS protocol data units (CPS-PDU), each of which forms the payload of an ATM cell. These parameter values may be defined per channel identifier (CID) or for a group of CIDs.

11 Claims, 5 Drawing Sheets

METHOD AND APPARATUS FOR DYNAMIC BANDWIDTH ALLOCATION FOR VOICE AND DATA MULTIPLEXING OVER AAL-2 CONNECTIONS

BACKGROUND OF THE INVENTION

The ATM Adaptation Layer type 2 (AAL-2) standard, as defined in the ITU-T I.363.2 recommendation, provides for bandwidth efficient transmission of low-rate, short, and variable length packets in delay sensitive applications. AAL-2 enables multiplexing of different user information streams into a single logical connection (ATM-VCC). These user information streams may include voice, compressed voice and data, real-time user information and non-real-time user information, which have different quality of service demands, such as transfer delay and latency.

The Service Specific Segmentation and Reassembly Sublayer (SSSAR) segments (and reassembles) complete frames of information from user information streams into Common Part Sublayer (CPS) service data units (CPS-SDU) that form the payload of CPS packets. CPS packets originating from different applications have different channel identifiers (CID) and may be multiplexed into the same CPS protocol data unit (CPS-PDU) for transmission in a single ATM cell.

The AAL-2 standard sets the maximum length of a CPS-SDU to be either 45 octets (the default) or 64 octets. However, the standard neither specifies the actual length of the segments nor does it specify how to determine this length. Typically, the segment length is set as a general parameter that is predefined during the establishment of a channel (ATM-VCC). Using a fixed segment length per logical ATM connection is a compromise that balances the traffic stream (user information), the current and average connection bandwidth utilization and the quality of service demands of the voice and high-priority data. It may lead to frequent use of the "split" and "part" state variables, which in turn may result in difficulty meeting jitter and delay demands of a voice application. It may also lead to inefficient utilization of the bandwidth, and, in some cases, may cause extra processing power to be spent segmenting and reassembling unnecessary CPS-SDUs.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
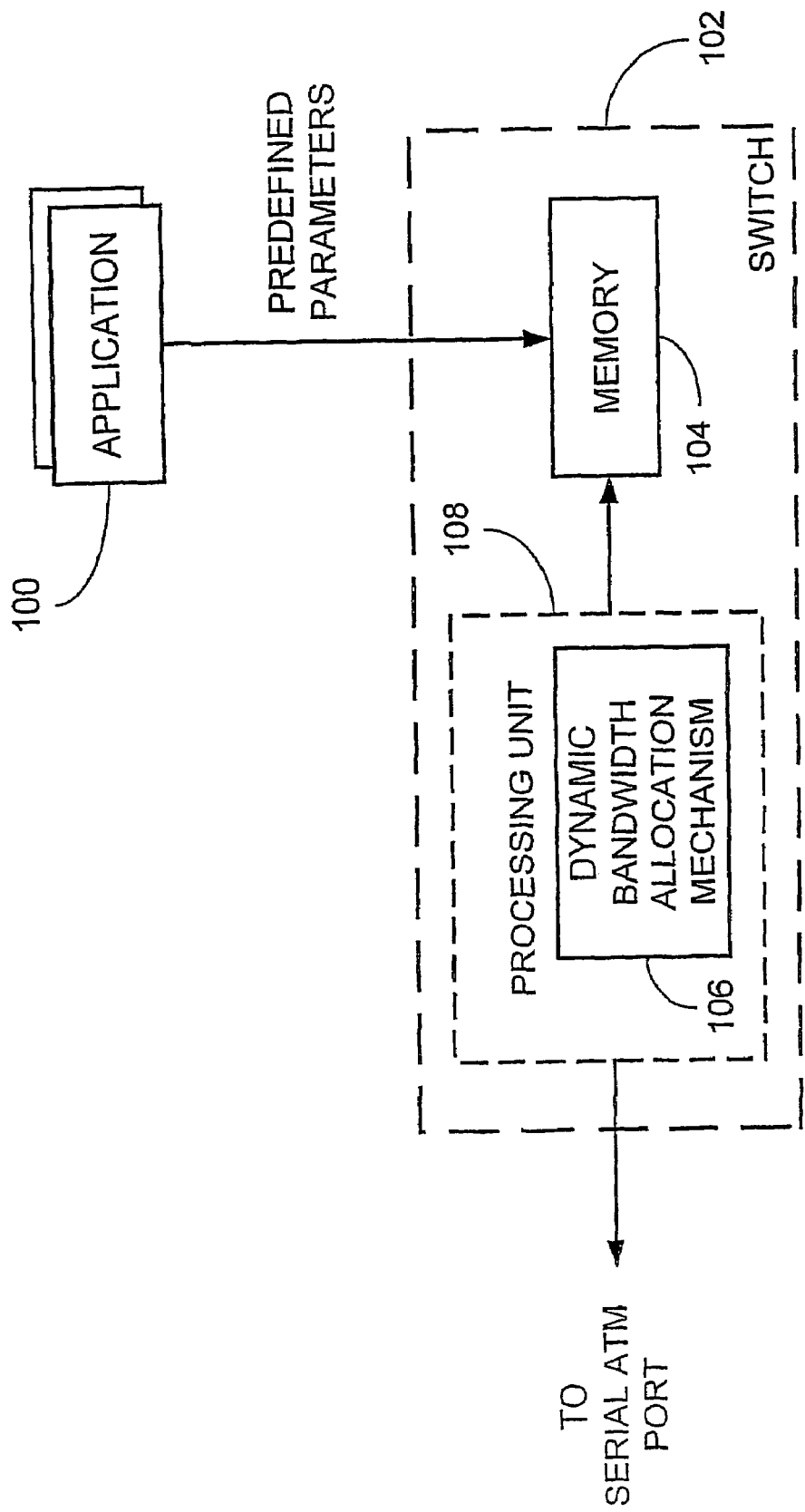
FIG. 1 is a simplified block diagram illustration of applications and a switch, according to some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures and components have not been described in detail so as not to obscure the present invention.

Reference is made to FIG. 1, which is a simplified block diagram illustration of applications and a switch, according to some embodiments of the present invention Applications 100 presenting user information streams at a service access point (SAP) to an AAL-2 switch 102 at a hierarchical level above the Common Part Sublayer (CPS), for example, a Service Specific Convergence Sublayer (SSCS)-SAP, may provide values for predefined parameters to a memory 104 of switch 102 for storage therein. A dynamic bandwidth allocation mechanism 106 of a processing unit 108 of switch 102 may use these predefined parameters to determine how frames of information in the user information streams are segmented in run-time into CPS packets and packed into CPS protocol data units (CPS-PDU), each of which forms the payload of an ATM cell. In some implementations of the AAL-2 standard, the segmentation of frames into CPS service data units (CPS-SDU) is performed in advance. In contrast, embodiments of the present invention may decide in run-time the size of each CPS-SDU according to the specific parameter values and state variables such as the available bandwidth. Since the segmentation of frames is performed in run-time, it may save memory consumption, processing time and buffer management.

These parameter values may be defined per channel identifier (CID) or for a group of CIDs, thus enabling each application to set the parameter values according to its particular requirements.

One of the predefined parameters is TrafficType, which may determine how the other parameters are used, if at all, while processing and multiplexing the stream of a particular CID. As with the other predefined parameters, the TrafficType parameter may have a different value for each CID or group of CIDs, thus enabling different processing for each CID or group of CIDs. It is defined by an application according to the user stream characteristics (for example, signaling, voice, real-time data and non-real time data) and quality of service requirements. For example, the TrafficType parameter may enable an application providing a voice over Internet Protocol (VoIP) user information stream to insist that the stream, which may enter an AAL-2 VCC at the same SAP used by applications producing non-real-time data, be treated the same way as a voice user information stream, since VoIP and voice have similar quality of service requirements.

Another of the predefined parameters is the minimum data packet size threshold (MinT). This parameter sets a minimum value to the size of a CPS packet into which frames of information in the user information stream for a particular CID may be segmented. The smaller the size of the CPS packets, the greater the inherent overhead (the ratio between the actual user information and the CPS packet header (CPS-PH)). Therefore, the MinT parameter may represent the maximum overhead acceptable by the application providing the user information stream. As will be seen below with respect to FIG. 3, when the "split" and "part" state variables are used for a packet from a particular channel, the latency introduced to voice packets that follow the split/part packet is greater when the value of the MinT parameter for that channel is larger. Therefore, when configuring the value of the MinT parameter of a channel, the conflicting requirements of minimizing the overhead and minimizing the latency may need to be considered in view of the specific system demands. However, since the value of the MinT parameter may be different for different applications, it may allow for more flexibility than the fixed segment length of typical implementations, which is a compromise of the requirements of all the applications taken as a whole.

Another of the predefined parameters is the maximum data size threshold (MaxT). This parameter sets a maximum value to the size of a CPS packet into which frames of information in the user information stream for a particular CID may be segmented. The larger the size of the CPS packets, the greater the delay between data streams being multiplexed into the CPS-PDU.

According to some embodiments of the present invention, the Management Plane may dynamically alter values of any or all of the predefined in run-time. In deciding to alter the values, the Management Plane may tale into account various factors of the AAL-2 connection, including, for example, the total number of CIDs currently using the connection, the type of applications currently using the connection, the general bandwidth of the system, the hour of day, etc.

Dynamic bandwidth allocation mechanism 106 may calculate the available bandwidth (ABW). The ABW may be the number of bytes in the current CPS-PDU that are available to be packed with CPS packets or padding bytes. Alternatively, the ABW may be calculated over a number of cells and may therefore be an average value. Alternatively, the ABW may be calculated using a more complicated method that biases the ABW allocation according to the requirements of the applications whose user information streams are being multiplexed into the CPS-PDUs.

Figure 2:
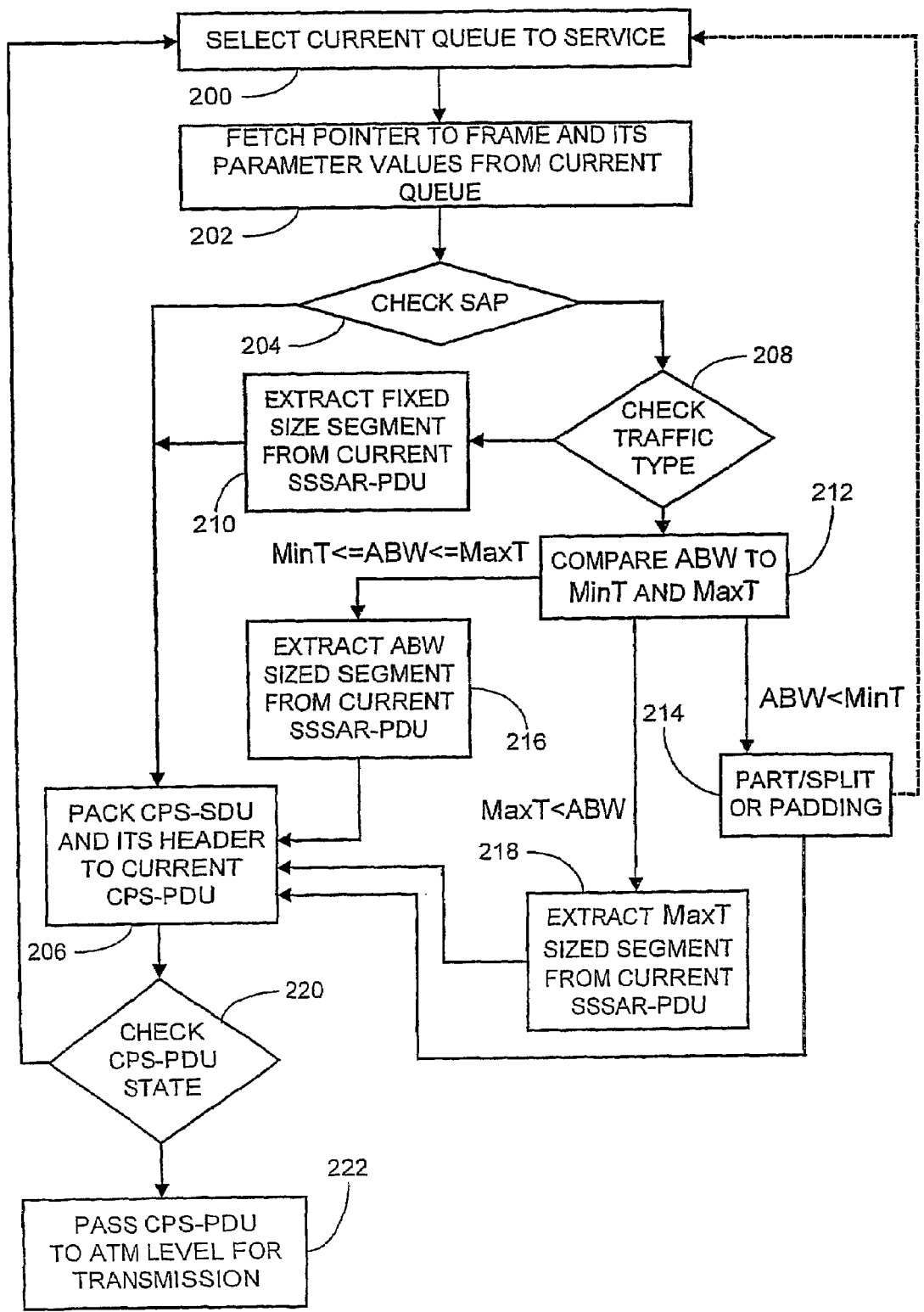
FIG. 2 is a simplified flowchart illustration of a method for segmenting frames into Common Part Sublayer (CPS) packets and the packing of those CPS packets into a CPS protocol data unit (CPS-PDU), according to some embodiments of the present invention.

Reference is now made to FIG. 2, which is a simplified flowchart illustration of a method for segmenting frames into CPS packets and the packing of those CPS packets into a CPS-PDU, according to some embodiments of the present invention Processing unit 108 may select a current queue to service (step 200). This selection may be made in accordance with a dequeueing algorithm, for example, strict priority, deficit round robin, etc. A pointer to a frame may be fetched from the current queue and the parameter values for the CID of the current queue may be read from memory 104 (step 202).

Processing unit 108 may check the SAP of the current queue (step 204). If the user information stream of the current queue is being presented at a CPS-SAP, then it is being presented as CPS-SDUs and processing unit 108 may pack the CPS-SDU and its header to the current CPS-PDU (step 206). If, however, the user information stream of the current queue is being presented at a SAP at a hierarchical level above the CPS, then dynamic bandwidth allocation mechanism 106 may check the value of the TrafficType parameter for the CID of the current queue (step 208).

The value of the TrafficType parameter may determine how dynamic bandwidth allocation mechanism 106 will allocate the ABW to be used by this specific CID in the current and following CPS-PDU. Since the number of different values that the TrafficType parameter may have is limited only by the maximum number of CIDs, which according to the AAL-2 standard is 256, many different processing algorithms may be implemented by dynamic bandwidth allocation mechanism 106. For clarity, only a few possible processing algorithms are described herein. One possible processing algorithm is that dynamic bandwidth allocation mechanism 106 may extract a fixed-size segment from the current frame (step 210). This algorithm may be appropriate, for example, for frames of voice, signaling and real-time data, in which the fixed-size is the value of the MaxT parameter for those channels. The value of MaxT for voice channels might be 16 bytes. Values of MaxT for signaling and for real-time data might include, for example, 45 bytes. The segment, a CPS-SDU, may then be packed with its header into the current CPS-PDU (step 206). Processing unit 108 may then check the state of the current CPS-PDU (step 220). If it is complete, then processing unit 108 may pass the CPS-PDU to the ATM level from transmission via a serial ATM port (step 222). If the CPS-PDU is not yet complete, then the method may resume from step 200.

Another possible processing algorithm is that dynamic bandwidth allocation mechanism 106 may segment the frames into CPS-SDUs whose length is determined by the ABW and the values of the MinT and MaxT parameters for those channels (step 212). Such algorithms may be appropriate, for example, for non-real-time data. Exemplary embodiments of how dynamic bandwidth allocation mechanism 106 compares ABW to MinT and MaxT in order to determine the length of the CPS-SDU include different treatment for the case of ABW less than MinT (step 214), ABW between the values of MinT and MaxT (step 216) and ABW greater than MaxT (step 218). The examples of steps 214, 216 and 218 are described hereinbelow in FIGS. 3, 4 and 5, respectively, and they are provided for the purposes of illustration only and are not intended to limit the scope of the claimed invention whatsoever.

The CPS-SDU extracted according to the calculations of dynamic bandwidth allocation mechanism 106 in steps 216 and 218 may be packed with its header into the current CPS-PDU (step 206), with the method then continuing to step 220. In the case of step 214, if dynamic bandwidth allocation mechanism 106 decides to pack the current CPS-SDU with padding bytes, then the method continues to step 200. If, however, dynamic bandwidth allocation mechanism 106 decides to use the "part/split" state variables, then the first part of the CPS-SDU and its header are packed in the current CPS-PDU in step 206, and the remaining part of the CPS-SDU is packed in the next CPS-PDU, in accordance with the standard.

Figure 3:
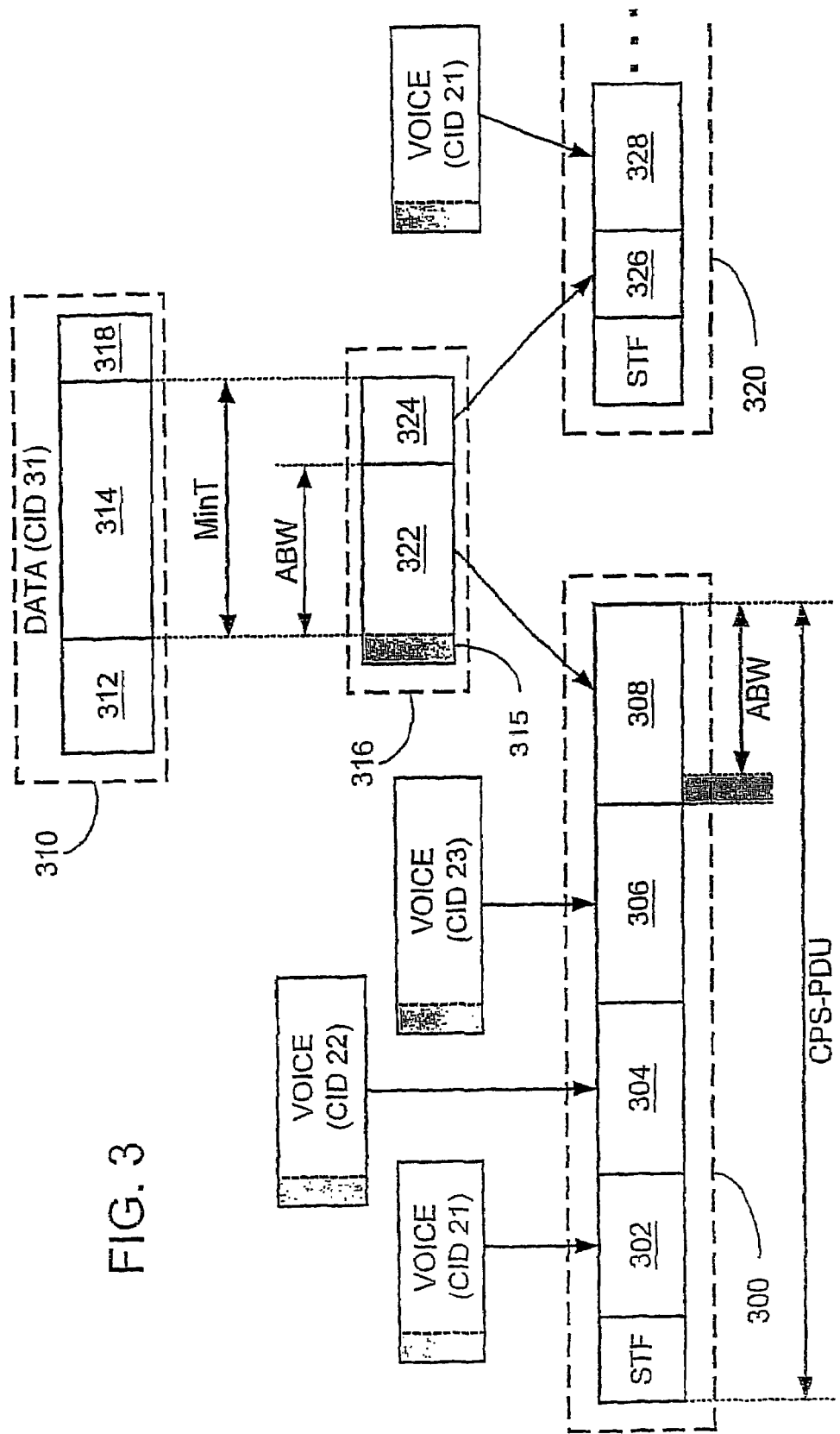
FIGS. 3, 4 and 5 are exemplary illustrations of the segmentation of frames into CPS packets and the packing of those CPS packets into a CPS-PDU, according to some embodiments of the present invention.
Figure 4:
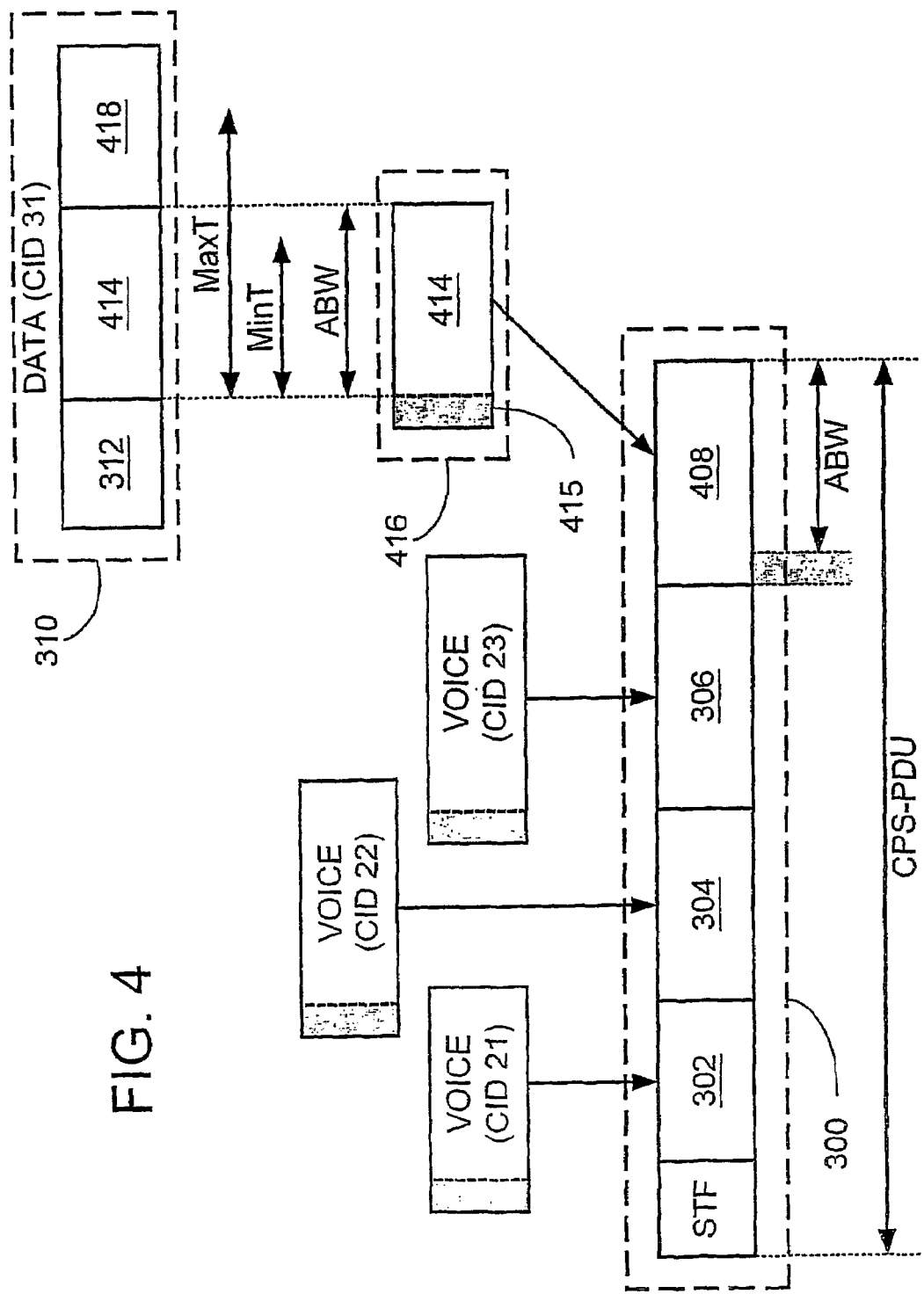
Figure 5:
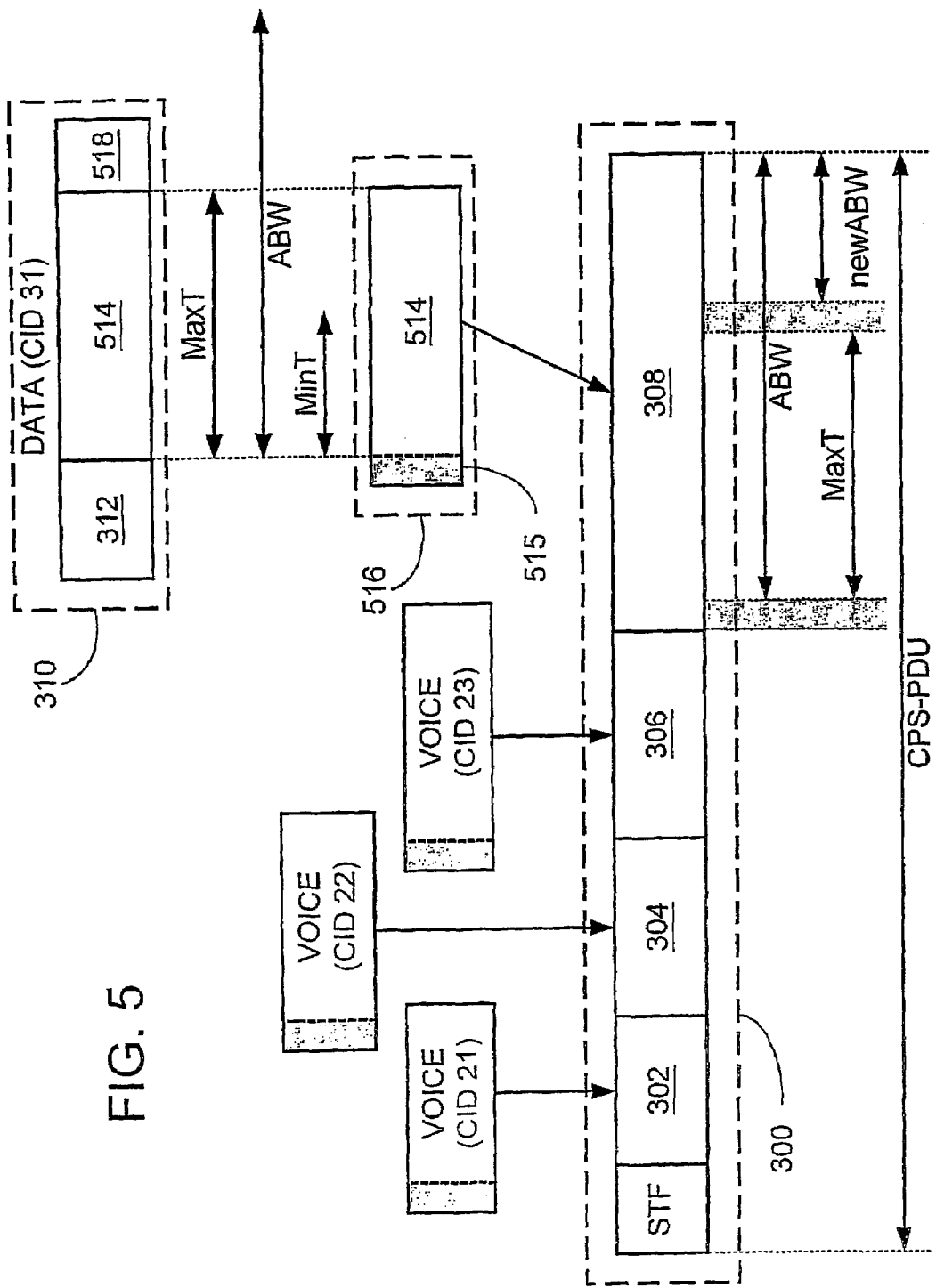

FIGS. 3, 4 and 5 are exemplary illustrations of the segmentation of frames into CPS packets and the packing of those CPS packets into a CPS-PDU, according to some embodiments of the present invention. Reference numerals may be repeated among the figures to indicate corresponding or analogous elements A CPS-PDU 300 having a start field STF is already packed with a voice CPS packet 302 from channel CID 21, followed by a voice CPS packet 304 from channel CID 22, followed by a voice CPS packet 306 from channel CID 23.

The unpacked portion of CPS-PDU 300, referenced 308, will be filled with one or more CPS packets or with padding bytes according to the calculated ABW. A scheduler (not shown) indicates that the next CPS packet is to be taken from a non-real-time data frame 310 whose CID is 31. A portion 312 of data frame 310 has already been packetized.

In the example shown in FIG. 3, the MinT parameter for CID 31 has a value that is more than ABW. Dynamic bandwidth allocation mechanism 106 may take from data frame 310 a portion 314 of length MinT. Together with a CPS-PH 315, portion 314 creates a CPS packet 316. A remaining portion 318 of data frame 310 will form part of a different CPS packet. Dynamic bandwidth allocation mechanism 106 may not pack all of CPS packet 316 into CPS-PDU 100 because there are not enough available bytes.

In some embodiments of the present invention, dynamic bandwidth allocation mechanism 106 may always fill portion 308 with padding bytes (not shown). In other embodiments, dynamic bandwidth allocation mechanism 106 may always fill portion 308 with part of CPS 316 and pack the remainder of CPS packet 316 into the next CPS-PDU, referenced 320. In other words, the "split" and "part" state variables may be used so that a portion 322 of CPS packet 316 that has a length of ABW, is packed together with CPS-PH 315 into CPS-PDU 300. The remainder of CPS packet 316, referenced 324, may be packed into the beginning of CPS-PDU 320, referenced 326. CPS-PDU 320 may then be packed with the next packet that the scheduler indicates, for example a voice packet 328 from CID 21. In still other embodiments of the present invention, the decision whether to fill portion 308 with padding bytes or to part/split the CPS packet may depend upon the value of the TrafficType parameter for the current CID. In father embodiments of the present invention (not shown), dynamic bandwidth allocation mechanism 106 may decide to save CPS-PDU 300 and to halt packing until more data is available or until Timer CU expires.

In the case of part/split, it should be noted that the maximum packetization delay may be up to 2 ATM cell time slots. This worst case may occur if MinT has a value close to the maximum size of a CPS packet. It should also be noted that in typical implementations of the AAL-2 standard using a standard dequeueing algorithms it may be desirable to tune the dequeueing algorithm in order to compensate for the effects of the frequent use of the "split" and "part" state variables. In some embodiments of the present invention, however, the occurrence of part/split may be reduced, thus possibly enabling the use of a standard dequeueing algorithm as is and possibly providing a transmission layer in which the throughput provided to each CID may be calculated more predictably.

In the example shown in FIG. 4, the MinT parameter for CID 31 has a value that is less than ABW, while the MaxT parameter for CID 31 has a value that is more than ABW. Dynamic bandwidth allocation mechanism 106 may take from data frame 310 a portion 414 of length ABW. Together with a CPS-PH 415, portion 414 creates a CPS packet 416. A remaining portion 418 of data frame 310 will form part of a different CPS packet. Dynamic bandwidth allocation mechanism 106 may pack all of CPS packet 416 into CPS-PDU 300, thus avoiding the use of the "split" and "part" state variables.

In the example shown in FIG. 5, the MaxT parameter for CID 31 has a value that is less than ABW. Dynamic bandwidth allocation mechanism 106 may take from data frame 310 a portion 514 of length MaxT. Together with a CPS-PH 515, portion 514 creates a CPS packet 516. A remaining portion 518 of data frame 310 will form a part of a different CPS packet Dynamic bandwidth allocation mechanism 106 may pack CPS packet 516 into CPS-PDU 300, this filling MaxT bytes of portion 308, plus the number of bytes necessary for a CPS-PH. CPS-PDU 300 may now have an unpacked portion of length ABW-MaxT, which, taking into account a CPS-PH, leaves a new available bandwidth new ABW. Dynamic bandwidth allocation mechanism 106 may continue to process CPS-PDU 300 by dealing with new ABW according to the parameter values of the next CID that the scheduler indicates should be packed into CPS-PDU 300.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method comprising:
receiving a traffic-type parameter and one or more predefined parameters for an ATM Adaptation Layer type 2 (AAL-2) connection;
segmenting in run-time a frame of user information received over said AAL-2 connection into a Common Part Sublayer (CPS) service data unit whose length is determined according to said traffic-type parameter and according to one or more of said predefined parameters; and
calculating an available bandwidth for a current CPS protocol data unit (CPS-PDU),
wherein receiving said predefined parameters comprises receiving a minimum data size threshold parameter and a maximum data size threshold parameter, and
wherein segmenting said frame comprises:
comparing said available bandwidth to said minimum data size threshold parameter and said maximum data size threshold parameter; and
extracting said CPS service data unit with a length equivalent to said available bandwidth if said available bandwidth has a value between or equal to said minimum data size threshold parameter and said maximum data size threshold parameter.

2. A method comprising:
receiving a traffic-type parameter and one or more predefined parameters for an ATM Adaptation Layer type 2 (AAL-2) connection:
segmenting in run-time a frame of user information received over said AAL-2 connection into a Common Part Sublayer (CPS) service data unit whose length is determined according to said traffic-type parameter and according to one or more of said predefined parameters; and
calculating an available bandwidth for a current CPS protocol data unit (CPS-PDU),
wherein receiving said predefined parameters comprises receiving a maximum data size threshold parameter; and
wherein segmenting said frame comprises:
comparing said available bandwidth to said maximum data size threshold parameter; and
extracting said CPS service data unit with a length equivalent to said maximum data size threshold parameter if said available bandwidth has a value greater than said maximum data size threshold parameter.

3. The method of claim 2, further comprising:
dynamically altering one or more of said predefined parameters in run-time.

4. The method of claim 2, wherein calculating said available bandwidth comprises calculating a number of bytes in said current CPS-PDU that are available to be packed with CPS packets or padding bytes.

5. The method of claim 2, wherein calculating said available bandwidth comprises calculating an average available bandwidth over a number of ATM cells.

6. The method of claim 2, wherein segmenting said frame comprises extracting said CPS service data unit with a length equivalent to said available bandwidth.

7. The method of claim 2, wherein segmenting said frame comprises comparing said available bandwidth to said predefined parameters.

8. The method of claim 2, further comprising:
enabling an application presenting user information at a service access point to an ATM Adaptation Layer type 2 (AAL-2) switch at a hierarchical level above the Common Part Sublayer (CPS) to provide values for predefined parameters that are used in run-time to determine how frames of said user information are segmented into CPS service data units.

9. A method comprising:
receiving a traffic-type parameter and one or more predefined parameters for an ATM Adaptation Layer type 2 (AAL-2) connection;
segmenting in run-time a frame of user information received over said AAL-2 connection into a Common Part Sublayer (CPS) service data unit whose length is determined according to said traffic-type parameter and according to one or more of said predefined parameters; and
calculating an available bandwidth for a current CPS protocol data unit (CPS-PDU),
wherein receiving said predefined parameters comprises receiving a minimum data size threshold parameter,
segmenting said frame comprises comparing said available bandwidth to said minimum data size threshold parameter; and
the method further comprises:
packing said current CPS-PDU with padding bytes if said available bandwidth has a value less than said minimum data size threshold parameter.

10. A method comprising:
receiving a traffic-type parameter and one or more predefined parameters for an ATM Adaptation Layer type 2 (AAL-2) connection:
segmenting in run-time a frame of user information received over said AAL-2 connection into a Common Part Sublayer (CPS) service data unit whose length is determined according to said traffic-type parameter and according to one or more of said predefined parameters; and
calculating an available bandwidth for a current CPS protocol data unit (CPS-PDU),
wherein receiving said predefined parameters comprises receiving a minimum data size threshold parameter, and
wherein segmenting said frame comprises:
comparing said available bandwidth to said minimum data size threshold parameter; and
extracting said CPS service data unit with a length equivalent to said minimum data size threshold parameter if said available bandwidth has a value less than said minimum data size threshold parameter.

11. An ATM Adaptation Layer type 2 (AAL-2) switch comprising:
a memory able to store for an AAL-2 connection a traffic-type parameter and one or more predefined parameters including a maximum data size threshold parameter; and
a processing unit comprising a dynamic bandwidth allocation mechanism, said dynamic bandwidth allocation mechanism able to calculate an available bandwidth for a current CPS protocol data unit and to determine in run-time according to said traffic-type parameter and one or more of said predefined parameters a length of a Common Part Sublayer (CPS) service data unit to be extracted from a frame of user information received over said AAL-2 connection, said processing unit further being able to compare said available bandwidth to said maximum data size threshold parameter and to extract said CPS service data unit with a length equivalent to said maximum data size threshold parameter if said available bandwidth has a value greater than said maximum data size threshold parameter.

* * * * *